March 22, 1932.   F. BODENHORN   1,850,197
AUTOMOBILE FREE WHEELING DEVICE
Filed Dec. 23, 1930   4 Sheets-Sheet 1

Inventor
Frank Bodenhorn
By Clarence A. O'Brien
Attorney

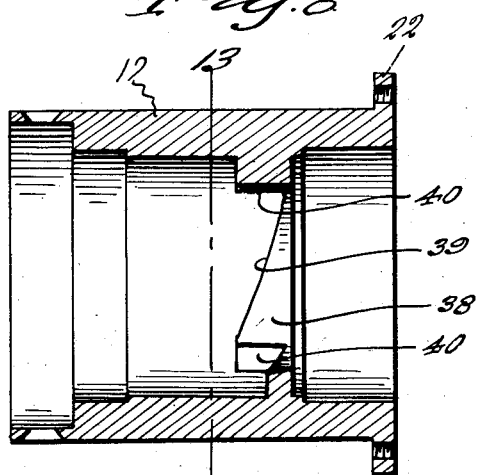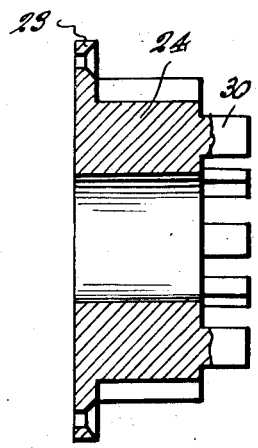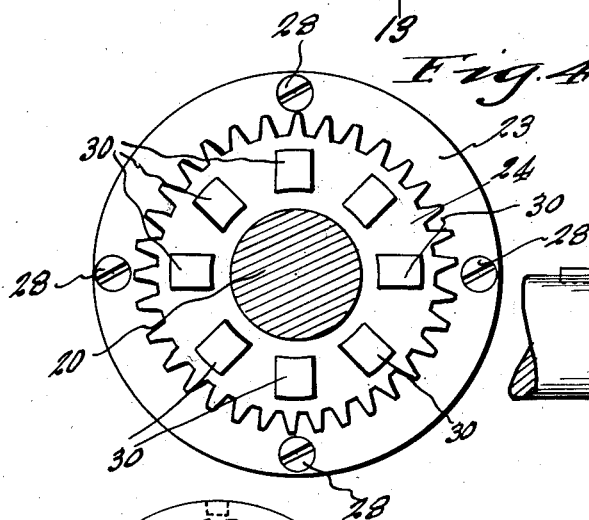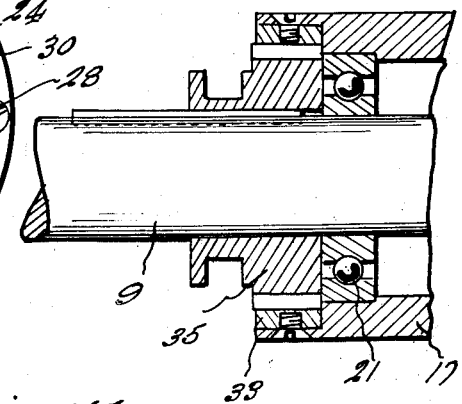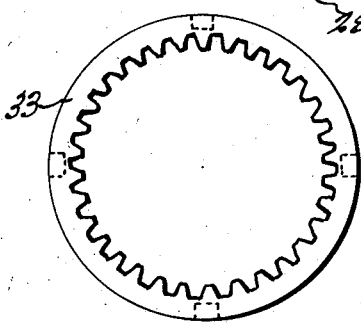

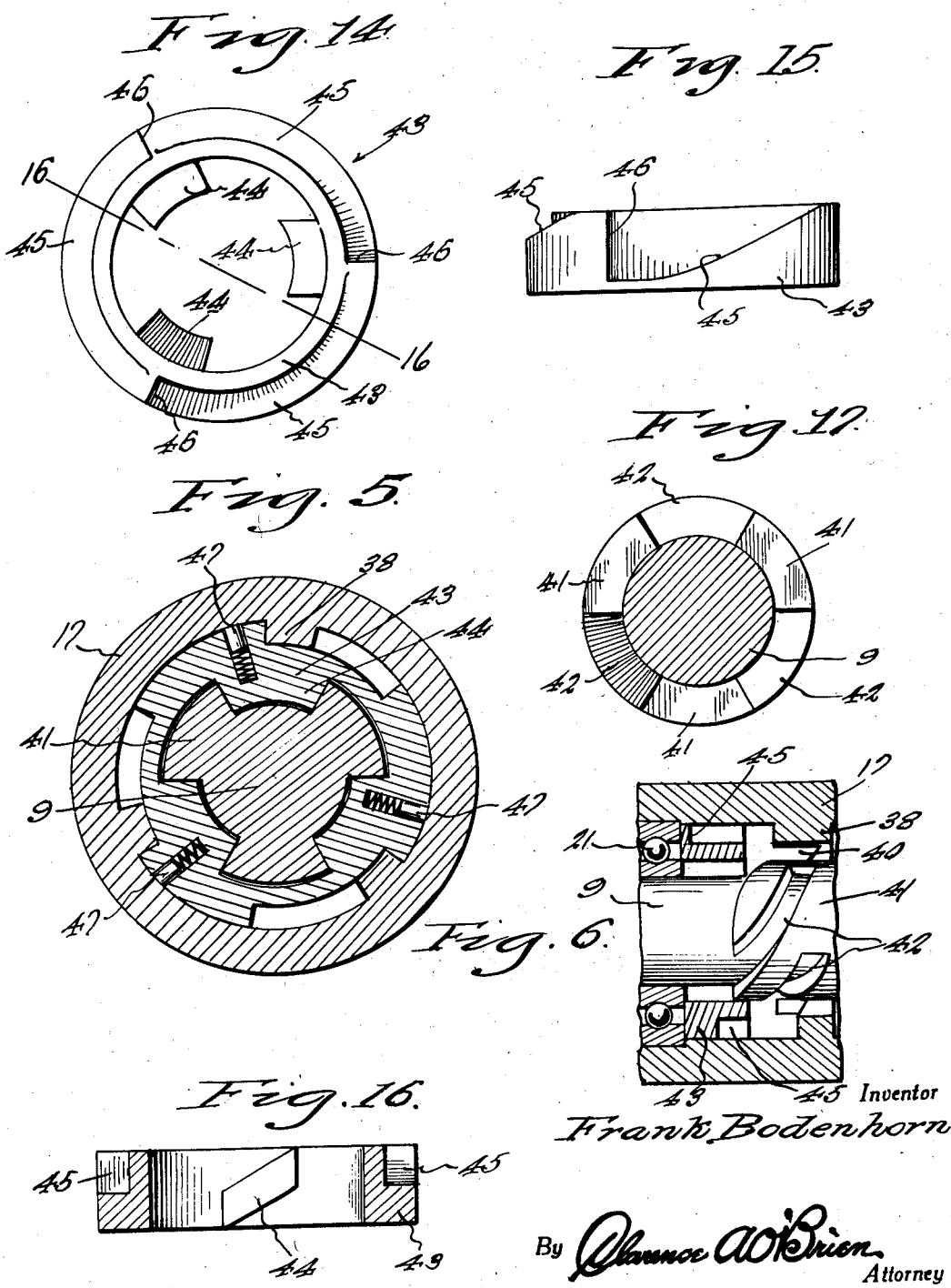

Patented Mar. 22, 1932

1,850,197

UNITED STATES PATENT OFFICE

FRANK BODENHORN, OF FORT WAYNE, INDIANA, ASSIGNOR OF ONE-HALF TO THOMAS B. PRESTON, OF FORT WAYNE, INDIANA

AUTOMOBILE FREE WHEELING DEVICE

Application filed December 23, 1930. Serial No. 504,339.

The present invention relates to an automobile free wheeling device and has for its primary object to provide, in a manner as hereinafter set forth, a device of this character which is incorporated in the transmission of the automobile between the transmission gears and the automobile clutch.

Other important objects of the invention are to provide a free wheeling device of the character set forth for automobiles which will be comparatively simple in construction, strong, durable, efficient and reliable in operation and which may be manufactured and installed at low cost.

All of the foregoing and still further objects and advantages of the invention may become apparent from a study of the following specification, taken in connection with the accompanying drawings wherein like characters of reference designate corresponding parts throughout the several views, and wherein:—

Figure 3 is a longitudinal horizontal sectional view taken substantially on the line 3—3 of Figure 1.

Figure 4 is a cross sectional view taken substantially on the line 4—4 of Figure 3.

Figure 5 is a vertical cross sectional view taken substantially on the line 5—5 of Figure 3.

Figure 6 is a fragmentary detail view in vertical longitudinal section taken through the intermediate portion of the device showing the automatic clutch in inoperative position to permit free wheeling of the automobile.

Figure 7 is a fragmentary view in vertical longitudinal section showing the device locked to the clutch shaft of the automobile for rendering the device inoperative.

Figure 8 is a detail view in vertical longitudinal section through the casing of the free wheeling device.

Figure 9 is a detail view in vertical longitudinal section through the internal annular clutch part which is fixed in one end of the casing illustrated in Figure 8.

Figure 10 is a detail view principally in section through the driving gear which is fixed on the rear end of the casing.

Figure 11 is a detail view in end elevation of the internal annular clutch part illustrated in Figure 9.

Figure 12 is a fragmentary detail view in side elevation showing the rear end portion of the clutch shaft.

Figure 13 is a vertical cross sectional view through the casing taken substantially on the line 13—13 of Figure 8.

Figure 14 is a detail view in end elevation of the clutch device which operatively connects the clutch shaft to the casing.

Figure 15 is a view in side elevation of the clutch device illustrated in Figure 14.

Figure 16 is a detail view in section taken substantially on the line 16—16 of Figure 14.

Figure 17 is a vertical cross sectional view taken substantially on the line 17—17 of Figure 12.

Figure 1:
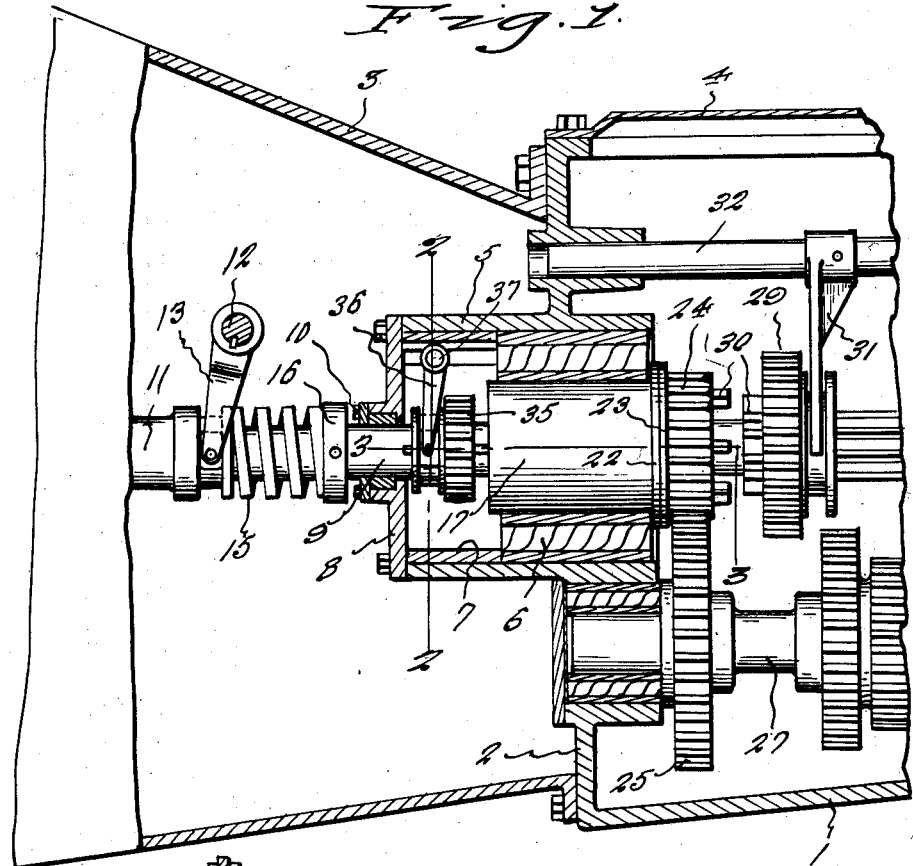
Figure 1 is a fragmentary view in vertical longitudinal section through a portion of a transmission and clutch housing showing a free wheeling device in accordance with this invention, said device being also shown in vertical longitudinal section.

Referring to the drawings in detail, it will be seen that the reference numeral 1 designates a transmission housing to the forward wall 2 of which is bolted a clutch housing 3. As usual a removable cover plate 4 is provided on the transmission housing 1.

A sleeve 5 is formed integrally on the forward end wall 2 of the transmission housing 1 and is horizontally and longitudinally disposed, said sleeve 5 having one end extending into the housing 1 and its other end extending into the clutch housing 3. A roller bearing 6 is operatively mounted in the rear portion of the sleeve 5 and is retained against forward movement in the sleeve by the spacing ring 7 which is disposed in the sleeve 5 between the bearing 6 and the closure plate 8 which is removably secured on the forward end of the sleeve 5 and through which the clutch shaft 9 rotatably passes, a packing 10 being provided for the clutch shaft 9. The usual clutch operating sleeve 11 is splined on the shaft 9 and is actuated by a transverse, horizontally disposed shaft 12 through the medium of the usual fork 13. The reference numeral 15 indicates the usual spring which encircles the shaft 9 and has one end engaged with the fixed annulus 16 on said shaft 9 and its other end operatively engaged with the clutch sleeve 11 for yieldingly urging the clutch of the automobile toward its engaged position.

A substantially cylindrical casing 17 is disposed for rotation in the roller bearing 6 and the clutch shaft 9 terminates at its rear end in said casing 17 as illustrated to advantage in Figure 3 of the drawings. Anti-friction bearings 18 and 19 are disposed in the rear portion of the casing 17, the bearing 18 receiving the rear end portion of the clutch shaft 9 and the bearing 19 supporting the forward end of the drive shaft 20 of the transmission. An anti-friction bearing 21 is also mounted in a forward portion of the casing 17 for the clutch shaft 9. The rear end of the casing 17 has formed thereon a flange 22 for abutting engagement with a flange 23 formed integrally on a drive gear 24 which is constantly in mesh with the transmission gear 25 which is fixed on the counter-shaft 27 of the transmission. Suitable means such as screws 28 secure the drive gear 24 to the casing 17. The drive shaft 20 of the transmission extends rotatably through the gear 24 into the bearing 19 in the casing 17. The drive gear 24 constitutes means for retaining the bearings 18 and 19 in position in the casing 17, as will be obvious. The usual splined gear 29 and the drive gear 24 are provided with coacting clutch elements 30 on their opposed sides for connecting the drive shaft 20 of the transmission directly to the clutch shaft 9 in the usual manner for high speed. The gear 29 is moved longitudinally in the transmission by the usual fork 31 on the slidable rod 32.

Figure 2:
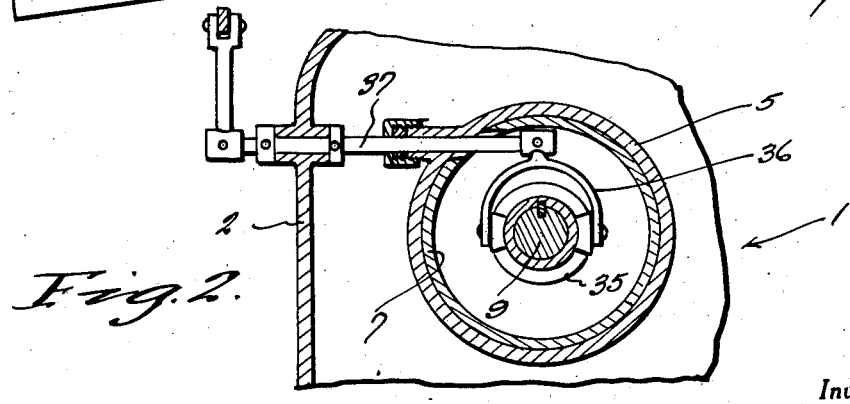
Figure 2 is a vertical cross sectional view taken substantially on the line 2—2 of Figure 1.

The forward end portion of the casing 17 is internally recessed to receive the annular internal clutch part 33 which is secured in position by suitable means, such as the screws 34. A clutch part 35 is splined on the clutch shaft 9 for engagement with the clutch part 33 for locking the casing 17 to the clutch shaft 9 in a manner to render the free wheeling device inoperative. The locking clutch part 35 is operatively engaged by a fork 36 on the transversely disposed, horizontal rock shaft 37 which is manually operable from the operator's seat of the automobile, the rock shaft 37 being journaled through the clutch housing 3, the sleeve 5 and the spacing ring 7 as illustrated to advantage in Figure 2 of the drawings. It will be noted that the locking clutch part 35 is enclosed in the sleeve 5.

Adjacent the anti-friction bearing 18 and spaced from the anti-friction bearing 21, the intermediate portion of the casing 17 has its inner periphery provided with an internal flange 38 in one side of which is a series of recesses 39 of a configuration which provides the abutments 40, as illustrated to advantage in Figure 8 of the drawings. The internal flange 38 on the casing 17 encircles a collar 41 which is fixed on the rear end portion of the clutch shaft 9 adjacent the anti-friction bearing 18. The collar 41 is provided with a series of spirally extending grooves or channels 42 extending thereinto from its forward end and terminating in spaced relation to its rear end, as illustrated to advantage in Figures 3 and 12 of the drawings. A clutch or coupling ring 43 is mounted for rotary and longitudinal movement on the collar 41 and has its inner periphery provided with the diagonally extending lugs 44 for travel in the spiral grooves or channels 42 on the collar 41. The outer periphery of the member 43 is provided with a series of recesses 45 extending thereinto from one side thereof, said recesses 45 being of a configuration substantially identical to the configuration of the recesses 39 in the internal flange 38 and providing the abutments 46 for engagement with the abutments 40 of the internal flange 38. The recesses 45 are disposed reversely with respect to the recesses 39 of the internal flange 38. Spaced peripherally on the member 43 and operable in sockets provided therefor are the spring pressed brake elements 47 (see Figure 5) which frictionally engage the inner periphery of the casing 17 to provide a frictional connection between said casing 17 and the member 43.

In operation, the locking clutch part 35 is shifted to the position illustrated to advantage in Figures 1 and 3 of the drawings. When the automobile is being driven by its engine through the clutch shaft 9 to the transmission, the member 43 is shifted rearwardly through the medium of the diagonal lugs 44 in the spiral or cam grooves or channels 42. It is understood, of course, that the shaft 9 is rotating faster than the casing 17 and under such circumstances the brake elements 47 which frictionally engage the casing 17 will drag the member 43 relative to the clutch shaft 9 to assure the shifting of said member 43 rearwardly. When the member 43 is moved rearwardly the abutments 46 thereon engage the abutments 40 of the internal flange 38 and in this manner the clutch shaft 9 will drive the casing 17. The gear 24 which is fixed on the rear end of the casing 17 will, of course, drive the transmission gear 25 and the countershaft 27 for driving the transmission gears in the usual manner or said gear 24 will drive the transmission gear 29 directly through the medium of the clutch elements 30. Should the direction of force be reversed, as when the automobile is drifting down hill, the casing 17, of course, will be rotated at greater speed than the clutch shaft 9 and the member 43 will be rotated on the clutch shaft 9 and thereby moved forwardly by the spiral or cam grooves or slots 42 until the abutments 46 are out of the path of the abutments 40 on the internal flange 38 and thus the casing 17 will be disconnected from the clutch shaft 9 and permit it to rotate at greater speed than said clutch shaft 9. As hereinbefore stated, when it is desired to positively lock the casing 17 to the clutch shaft 9, the lock clutch part 35 is moved rearwardly into engagement with the annular clutch part 33 in the forward end portion of the casing 17.

It is believed that the many advantages of a free wheeling device in accordance with this invention will be readily understood, and although the preferred embodiment of the invention is as illustrated and described, it is to be understood that changes in the details of construction may be had which will fall within the scope of the invention as claimed.

What is claimed is:—

1. In a free wheeling device for automobiles having a transmission including a housing and a clutch shaft extending rotatably into the housing, a casing rotatably mounted on the transmission housing and rotatably encircling the clutch shaft, supporting bearings in the casing for the clutch shaft, one-way clutch means in the casing and on the clutch shaft for operatively connecting the casing to the clutch shaft for actuation thereby in one direction, a gear fixed on the casing for operatively connecting the casing to the transmission gears, and manually operable means for positively locking the casing to the clutch shaft in a manner to retain said casing against rotation relative to the clutch shaft in opposite directions, the first named means comprising a collar fixed on the clutch shaft and having a plurality of cam grooves extending spirally therein, a series of abutments on the inner periphery of the casing disposed concentrically and in spaced relation to the collar, an annulus mounted for longitudinal and rotary movement between the collar and the abutments on the casing, spring pressed brake members carried by said annulus and frictionally engaging the casing, lugs on the inner periphery of the annulus disposed for travel in the cam grooves in the collar, and abutments on the outer periphery of the annulus engageable with the abutments on the inner periphery of the casing.

2. In a free wheeling device for automobiles of the character described, a transmission including a housing, a longitudinally extending, horizontally disposed sleeve mounted on the forward wall of the transmission housing and extending into said transmission, a roller bearing mounted in one end portion of the sleeve, a substantially cylindrical casing journaled for rotation in the bearing, a closure plate on the forward end of the sleeve, bearings mounted in the casing, a clutch shaft extending rotatably through the closure plate into the sleeve and the casing and journaled in certain of the bearings in the casing, a transmission drive shaft having its forward end journaled in the other of the bearings in the casing, a gear fixed on one end of the casing and disposed in the transmission housing for operatively connecting the casing to the transmission gears, one-way clutch means in the casing for operatively connecting said casing to the clutch shaft for actuation by said clutch shaft in one direction, a toothed annulus fixed in the forward end portion of the casing, and a manually operable toothed member splined for longitudinal movement on the clutch shaft and engageable with the toothed annulus for positively locking the casing to the clutch shaft.

In testimony whereof I affix my signature.
FRANK BODENHORN.